United States Patent
Holowczak et al.

(10) Patent No.: US 7,473,049 B2
(45) Date of Patent: Jan. 6, 2009

(54) CERAMIC-TO-METAL SHAFT ASSEMBLY

(75) Inventors: John E. Holowczak, South Windsor, CT (US); Constance Bird, Rocky Hill, CT (US); Gary E. Sanders, Windsor, CT (US); Anthony F. Giamei, Higganum, CT (US); Robert Telakowski, Windsor Locks, CT (US); Edward Allen Rothman, South Glastonbury, CT (US)

(73) Assignee: Hamilton Sundstrand, Windsor Locks, CT ( * ) Notice: Subject to any disclaimer, the term of this patent is extended or adjusted under 35 U.S.C. 154(b) by 150 days.

(21) Appl. No.: 11/343,071

(22) Filed: Jan. 30, 2006

(65) Prior Publication Data

US 2007/0177937 A1  Aug. 2, 2007

(51) Int. Cl.
*B25G 3/34* (2006.01)
(52) U.S. Cl. .................... 403/272; 403/334; 403/404
(58) Field of Classification Search ......... 403/267–272, 403/28–30, 334, 404
See application file for complete search history.

(56) References Cited

U.S. PATENT DOCUMENTS

| | | | | |
|---|---|---|---|---|
| 2,396,320 A | * | 3/1946 | Gaudenzo et al. ........... 285/187 |
| 2,972,808 A | * | 2/1961 | Litton ...................... 228/124.6 |
| 3,302,961 A | * | 2/1967 | Franklin ...................... 403/272 |
| 4,305,588 A | * | 12/1981 | Dodge ........................ 473/578 |
| 4,679,960 A | * | 7/1987 | Mizuhara ..................... 403/272 |
| 4,702,439 A | * | 10/1987 | Kelley et al. ............. 244/159.1 |
| 4,984,927 A | * | 1/1991 | Kojima et al. ................. 403/30 |
| 5,028,162 A | * | 7/1991 | Tsuno et al. .................. 403/30 |
| 5,370,596 A | * | 12/1994 | Compagnon ................. 492/45 |
| 6,886,484 B2 | * | 5/2005 | Thomas ...................... 114/108 |

* cited by examiner

*Primary Examiner*—Daniel P Stodola
*Assistant Examiner*—Joshua T Kennedy
(74) *Attorney, Agent, or Firm*—Carlson, Gaskey & Olds

(57) ABSTRACT

A shaft assembly includes a metallic portion and a ceramic portion. In a disclosed example, a ceramic shaft has a generally conical end that is at least partially received within a generally conical recess in one end of a metallic shaft. The recess has a first portion that has an inner surface that is received directly against a corresponding outer surface on a section of the ceramic shaft conical portion. A second portion of the recess is radially spaced from the ceramic shaft and provides a controlled gap within which a braze alloy is maintained. In one example, the second portion has an axial length that is more than twice a radial depth of the second portion. In another example, a transition surface between the first and second portions of the recess has a linear profile.

21 Claims, 2 Drawing Sheets

CERAMIC-TO-METAL SHAFT ASSEMBLY

FIELD OF THE INVENTION

This invention generally relates to shaft assemblies having a ceramic component and a metal component.

DESCRIPTION OF THE RELATED ART

High strength ceramic-to-metal shaft attachments are needed for a variety of components. One example is a ceramic integrally bladed rotor that may be used for example, for engine starters, gas turbine engines, turbo chargers and other types of rotating machinery. There is a considerable amount of known information regarding techniques for brazing and metallization techniques for creating ceramic-to-metal interfaces.

There exists a need to enhance the strength of ceramic-to-metal joints to enhance torque capacity. Another need exists to control the braze foil thickness and location during and after the ceramic-to-metal bonding operation. Typically, very complicated and error-prone brazing fixtures have been proposed. Additionally, precise control of brazing temperatures required with prior attempts minimize manufacturing economies.

One example arrangement is shown in U.S. Pat. No. 4,679,960 where a ceramic shaft includes a plurality of metal keys that are brazed to a metal shaft. A major disadvantage with this type of arrangement is that machining the ceramic shaft to accommodate the metal keys is expensive. A second disadvantage to this approach is that slots machined into the ceramic portion will act as stress concentrations, increasing the probability of failure under stress.

When brazing a metallic component to a ceramic component, the braze layer serves the important function of minimizing the thermal expansion mismatch stresses that develop upon cool down from the brazing temperature. Such stresses arise because of the large difference in thermal expansion between the ceramic and metal members. The active metal braze materials typically used have high ductility to help relieve stresses, however, the effect is substantially reduced as the brazed layer becomes very thin.

Accordingly, there is a need for controlling the braze thickness. Another need is to control the alignment between ceramic and metallic members. In the case of shafts, the ceramic and metal shafts must be axially aligned for proper end use. Typical braze fixtures used to achieve such alignment have not provided consistent results. Accordingly, grinding or machining the metallic member after the connection is made is almost always required. This additional step introduces further expense and time into the manufacturing process. Moreover, failure of the ceramic portion of the joint may occur during such machining.

This invention provides an improved connection between metallic and ceramic members that avoids the shortcomings and drawbacks of prior attempts discussed above.

SUMMARY OF THE INVENTION

One example assembly designed according to an embodiment of this invention includes a ceramic shaft and a metallic shaft. One of the shafts has a generally conical portion near one end. The other shaft has a generally conical recess that at least partially receives the generally conical portion of the one shaft. The generally conical recess has a first portion that is received directly against a corresponding section of the generally conical portion. The recess has a second portion that is spaced in a radial direction a selected distance from a corresponding section of the generally conical portion. The second portion of the recess has a length that extends in an axial direction that is more than twice as long as the selected distance. A braze alloy in the second portion secures the ceramic shaft to the metallic shaft.

In one example, the ceramic shaft has the generally conical portion and the metallic shaft has the recess.

In another example, a transition surface between the first and second portions of the recess has a linear profile.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
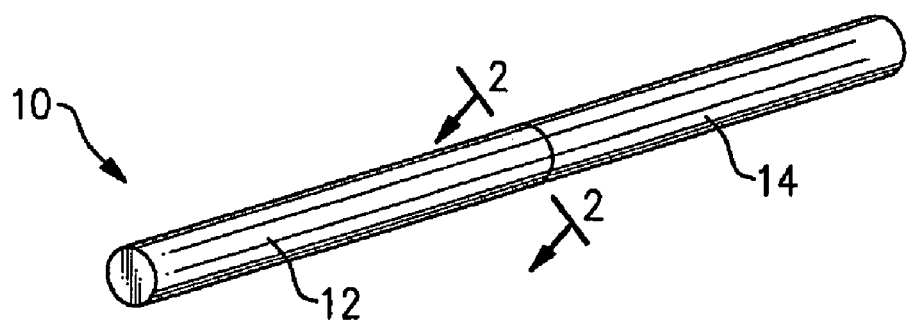
FIG. 1 schematically illustrates, in perspective view, an example shaft assembly designed according to an embodiment of this invention.

FIG. 1 schematically shows a shaft assembly 10 having a ceramic shaft 12 secured to a metallic shaft 14.

Figure 2:
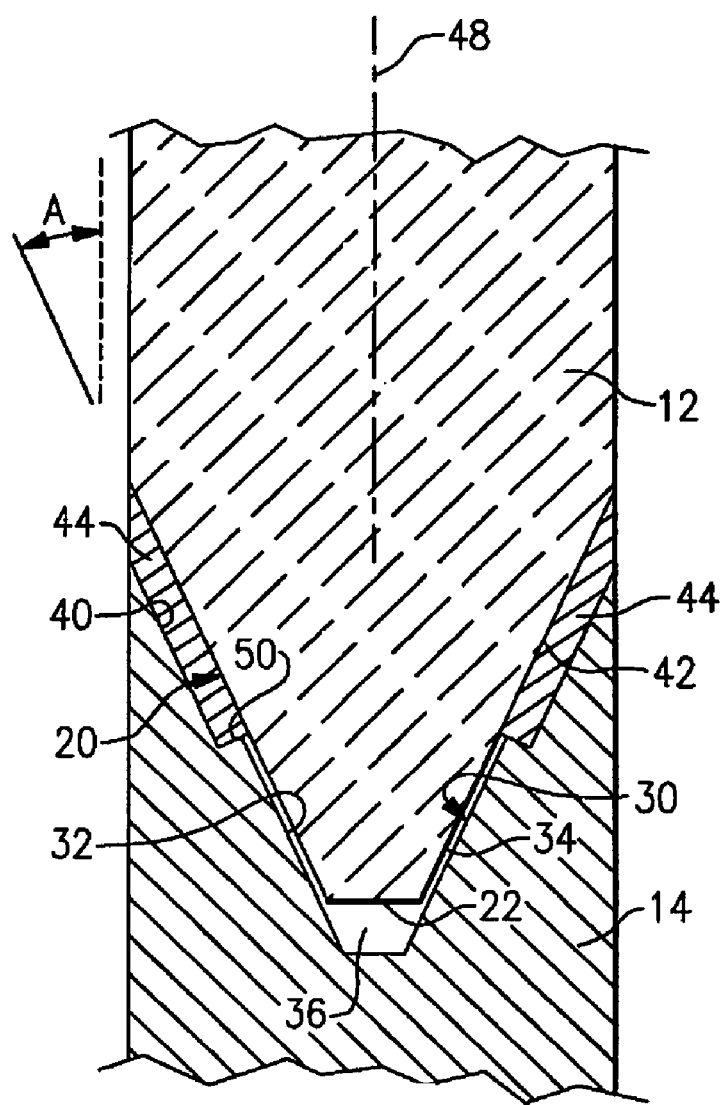
FIG. 2 is a cross-sectional illustration taken along the lines 2-2 in FIG. 1.

Referring to FIG. 2, the example ceramic shaft 12 has a generally conical portion 20 near one end. In this example, the end 22 of the conical portion 20 is truncated and the conical portion has a rounded outer surface. Other generally conical configurations for the end of the ceramic shaft 12 are within the scope of this invention. Those skilled in the art who have the benefit of this description will realize the specific geometry that best meets the needs of their particular situation.

The example metallic shaft 14 has a generally conical recess 30 that at least partially receives the generally conical portion 20 of the ceramic shaft 12. In the illustrated example, the recess 30 has a first portion 32 that has an inner surface against which a corresponding section 34 of the ceramic shaft 12 is directly received. The first portion 32 operates to axially align the ceramic shaft 12 with the metallic shaft 14.

In one example, the inside dimension of the first portion 32 of the recess 30 is set to correspond to the outside dimension of the section 34 of the ceramic shaft 12. In another example, the inside dimension of the first portion 32 is slightly larger than the outside dimension of the corresponding section 34. In this latter example, during brazing, the first portion 32 operates to further locate the center of the ceramic shaft 12, in part, because of the differing coefficients of expansion between the metallic and ceramic materials.

As can be appreciated from the drawing, the depth of the conical recess 30 is greater than the length of the generally conical portion 20 that is received within the recess. Accordingly, a gap 36 exists between the end 22 of the generally conical portion 20 and the deepest part of the recess 30. This gap further facilitates centering the shafts relative to each other.

The recess 30 includes a second portion 40 that is radially spaced from a corresponding section 42 of the generally conical portion 20 on the ceramic shaft 12. A braze alloy 44 within the second portion 40 secures the ceramic shaft 12 to the metallic shaft 14. In this example, the braze alloy 40 completely fills the gap between the ceramic shaft 12 and the second portion 40 of the recess 30.

One advantage to this example embodiment is that by selecting the radial distance between the inside surface on the second portion 40 and the outside surface on the corresponding section 42, the thickness of the braze alloy 44 can be selectively and particularly controlled. In other words, by setting the radial depth of the second portion 40, the example arrangement allows for tightly controlling the thickness of the braze alloy 44.

As can be appreciated from the drawing, the example second portion 40 has an axial length (e.g., in a direction along the axis 48) that is much greater than the radial depth (e.g., from right to left in the illustration) of the second portion 40. In one example, the length of the second portion 40 is more than two times greater than the depth (e.g., the distance between the inner surface of the second portion 40 and the outer surface of the corresponding section 42).

Another feature of this example is that a transition surface 50 between the first portion 32 and the second portion 40 has a linear profile. In the illustrated example, the transition surface 50 is approximately perpendicular to the surfaces of the first portion 32 and the second portion 40. Oblique angular arrangements for the transition surface relative to the first portion 32 surface and the second portion 40 surface are within the scope of this invention. One advantage to the perpendicular transition surface is that it operates to maintain the braze alloy within the second portion 40.

In the illustrated example, the first section 32 has an inner surface that is parallel with the inner surface of the second portion 40. In this example, the inner surfaces of the recess 30 are aligned at an angle A relative to the axis 48 of the shaft assembly. In one example, the angle A is between about 9° and about 20°.

In one example, a silicon nitride ceramic shaft 12 has a 0.625" diameter with a generally conical portion 20 at one end. An interlayer braze alloy 44 comprises two 0.004" thick Incusil active metal braze foil layers with a 0.010" thick molybdenum foil layer between them. The exterior geometry of the generally conical portion 20 of the ceramic shaft 12 is the same as the geometry of the foils used for the interlayer. The metallic shaft 14 in this example comprises Incoloy 909. This configuration has a torsional strength between about 260 and 290 lbs-ft.

In one example, the braze alloy foil is formed to have the desired geometry and placed into the second portion 40 of the recess 30 and then the conical portion 20 of the ceramic shaft 12 is placed into the recess 30. The assembly is then set into an appropriate brazing furnace with the axes of the shafts positioned vertically so that the cooperation between the first portion 32 and the corresponding section 34 provides a precise alignment of the shafts.

At the brazing temperature, the metallic shaft expands at a higher rate than the ceramic shaft. The gap between the metallic shaft 14 and the ceramic shaft 12 is controlled based upon the radial depth chosen for the second portion 40 and the known characteristics of the chosen metallic and ceramic materials (i.e., expansion rates). In one example, the gap that is filled by the braze alloy 44 is approximately 0.0035". At the brazing temperature, the brazed foil becomes liquid and fills that gap.

The metallic shaft 14 can be machined using conventional machine techniques to establish the stepped recess 30 having the first portion 32 and the second portion 40.

Figure 3:
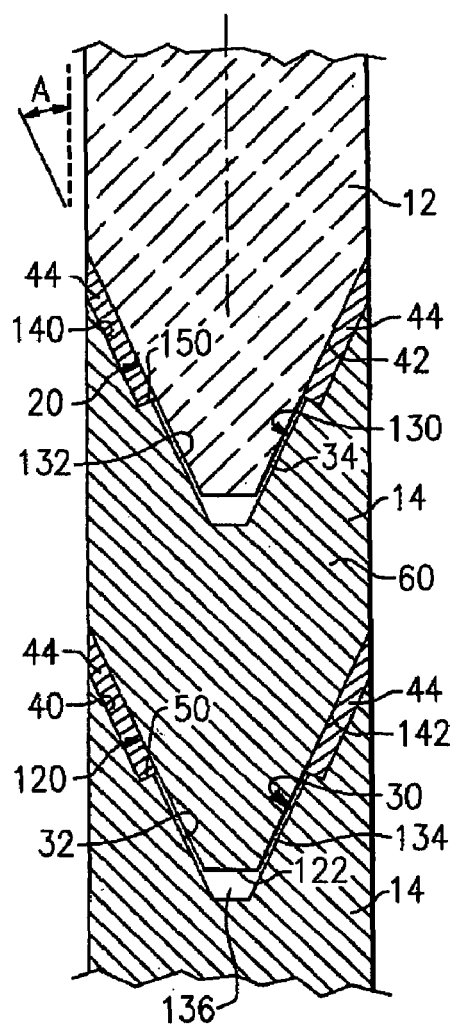
FIG. 3 is a cross-sectional illustration similar to that of FIG. 2 showing another example embodiment.

FIG. 3 illustrates another example embodiment where an intermediate thermal expansion metallic connecting member 60 is secured to the ceramic shaft 12 using the braze alloy 44. The metallic shaft 14 is then secured to the connection member 60 in a manner similar to that by which the connection member 60 is secured to the shaft 12. In this example, the intermediate connection member 60 is metallic and includes a generally conical recess 130 that receives the generally conical end 20 of the ceramic shaft 12. At an opposite end, the connection member 60 has a generally conical portion 120 that is at least partially received within the generally conical recess 30 of the shaft 14.

Arrangements such as that shown in the example of FIG. 3 allows for brazing a low expansion alloy connection member 60 to the ceramic shaft 12 using the stepped, conical configuration described above. The connection member 60 can then be brazed to the metallic shaft 14 also using a stepped conical configuration for the connection between the connection member 60 and the metallic shaft 14. In one example, the connection member 60 comprises TZM molybdenum. The unbrazed sections 34 and 134 of the conical portions 20 and 120, respectively, cooperate with the first portions 132 and 32, respectively to keep the ceramic shaft 12, the connection member 60 and the metallic shaft 14 axially aligned.

Figure 4:
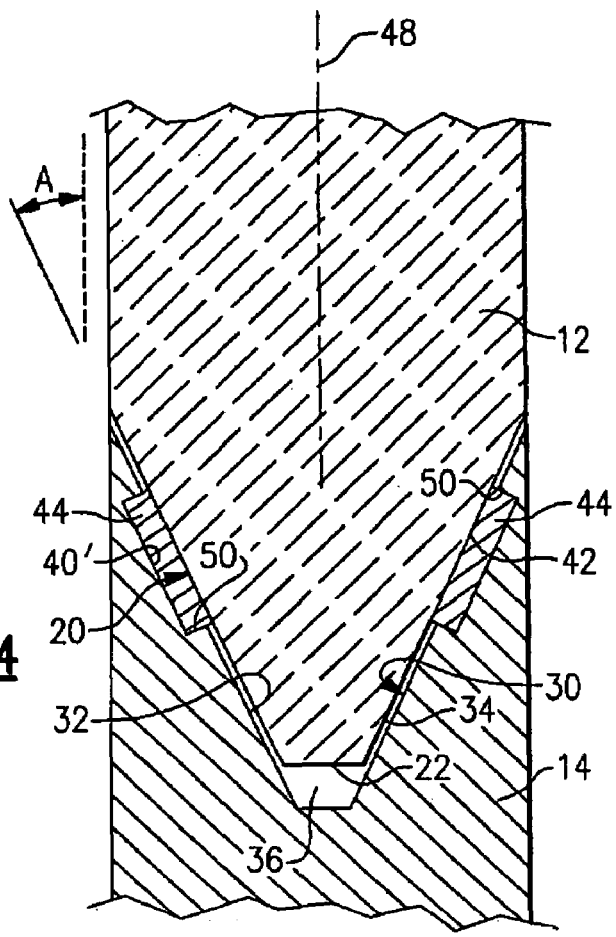
FIG. 4 is a cross-sectional illustration of still another embodiment.

FIG. 4 shows another example embodiment where the second portion 40 is different than what is included in the embodiment of FIG. 2, for example. In this example, the second portion 40' does not extend up to the open end of the recess 30. In this example, the second portion 40' comprises a ring or groove formed in the recess 30 for receiving the braze alloy. In one example, a braze foil is included. In another example, a braze ring is included.

The illustrated example includes transition surfaces 50 at each end of the second portion 40'. In this example, the transition services 50 are linear and aligned generally perpendicular to the surface of the recess 30 facing the conical portion 20.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A shaft assembly, comprising:
    a ceramic shaft comprising a ceramic material;
    a metallic shaft, one of the ceramic shaft or the metallic shaft having a generally conical portion near one end and the other of the shafts having a generally conical recess that at least partially receives the generally conical portion, the generally conical recess having a first portion that is received directly against a corresponding section of the generally conical portion, the generally conical recess having a second portion that is spaced in a radial direction a selected distance from a corresponding section of the generally conical portion, the second portion having a length extending in an axial direction that is more than twice as long as the selected distance; and
    a braze alloy in the second portion, the braze alloy directly contacting only the ceramic material of the ceramic shaft and the metal shaft for securing the ceramic shaft to the metallic shaft.

2. The assembly of claim 1, including a transition surface between the first and second portions that has a linear profile.

3. The assembly of claim 2, wherein the second portion of the conical recess extends between the transition surface and an open end of the conical recess.

4. The assembly of claim 2, wherein the first portion has a shaft-engaging surface that extends axially at a first angle and the transition surface is generally perpendicular to the first angle.

5. The assembly of claim 4, wherein the second portion has a surface that extends axially at the first angle.

6. The assembly of claim 4, wherein the second portion has a surface that extends axially at a second angle.

7. The assembly of claim 1, wherein the recess is operative to axially align the ceramic shaft with the metallic shaft when the generally conical portion is received in the recess.

8. The assembly of claim 1, wherein the first portion extends axially at a first angle and the second extends axially at least partially at a second different angle.

9. The assembly of claim 1, wherein the second portion has a radial depth and wherein the braze alloy has a thickness that is equal to the radial depth.

10. The assembly of claim 9, wherein the braze alloy completely fills the second portion and occupies all of the spacing between the second portion and the corresponding section of the one shaft.

11. The assembly of claim 1, wherein the second portion has a first transition surface spaced from a deepest end of the conical recess and a second transition surface spaced from an open end of the conical recess.

12. The assembly of claim 1, wherein the metallic shaft comprises a metallic connector member.

13. A shaft assembly, comprising:
a ceramic shaft comprising a ceramic material;
a metallic shaft, one of the ceramic shaft or the metallic shaft having a generally conical portion near one end and the other shaft having a generally conical recess that at least partially receives the generally conical portion, the generally conical recess having a first portion that is received directly against a corresponding section of the generally conical portion, the generally conical recess having a second portion that is spaced in a radial direction a selected distance from a corresponding section of the generally conical portion, a transition surface between the first and second portions having a linear profile; and
a braze alloy in the second portion, the braze alloy directly contacting only the ceramic material of the ceramic shaft and the metal shaft for securing the ceramic shaft to the metallic shaft.

14. The assembly of claim 13, wherein the second portion of the recess extends between the transition surface and an open end of the recess.

15. The assembly of claim 13, wherein the first portion has a shaft-engaging surface that extends axially at a first angle and the transition surface is generally perpendicular to the first angle.

16. The assembly of claim 15, wherein the second portion has a surface that extends axially at the first angle.

17. The assembly of claim 15, wherein the second portion has a surface that extends axially at a second different angle.

18. The assembly of claim 13, wherein the recess is operative to axially align the ceramic shaft with the metallic shaft when the generally conical portion is received in the recess.

19. The assembly of claim 13, wherein the second portion has a length extending in an axial direction that is more than twice the selected distance.

20. The assembly of claim 19, wherein the first portion has a length extending in an axial direction and wherein the first portion length is approximately equal to the second portion length.

21. The assembly of claim 13, wherein the second portion has a first transition surface spaced from a deepest end of the conical recess and a second transition surface spaced from an open end of the conical recess.

* * * * *

UNITED STATES PATENT AND TRADEMARK OFFICE
CERTIFICATE OF CORRECTION

| | |
|---|---|
| PATENT NO. | : 7,473,049 B2 |
| APPLICATION NO. | : 11/343071 |
| DATED | : January 6, 2009 |
| INVENTOR(S) | : Holowczak et al. |

It is certified that error appears in the above-identified patent and that said Letters Patent is hereby corrected as shown below:

ON THE TITLE PAGE:

Item 75 (line 2) Please correct Inventor Bird's information as follows:

"Constance Bird, Rocky Hill, CT" should read as --Constance Bird, Rocky Hills, CT--

IN THE CLAIMS:

Claim 1, Column 4, Line 61: "metal" should read as --metallic--

Signed and Sealed this

Thirty-first Day of March, 2009

JOHN DOLL
*Acting Director of the United States Patent and Trademark Office*